(12) United States Patent
Ye et al.

(10) Patent No.: US 12,728,903 B2
(45) Date of Patent: Sep. 8, 2026

(54) CAMPING TROLLEY

(71) Applicant: Ningbo Zhuokai Child Articles Co., Ltd., Cixi (CN)

(72) Inventors: Kairong Ye, Cixi (CN); Dongsheng Wang, Cixi (CN)

(73) Assignee: Ningbo Zhuokai Child Articles Co., Ltd., Cixi (CN)

(*) Notice: Subject to any disclaimer, the term of this patent is extended or adjusted under 35 U.S.C. 154(b) by 261 days.

(21) Appl. No.: 18/767,038

(22) Filed: Jul. 9, 2024

(65) Prior Publication Data

US 2024/0359718 A1 Oct. 31, 2024

(30) Foreign Application Priority Data

Nov. 7, 2023 (CN) ......................... 202311470129.4

(51) Int. Cl.
*B62B 3/02* (2006.01)
*B62B 5/04* (2006.01)

(52) U.S. Cl.
CPC .................. *B62B 3/02* (2013.01); *B62B 5/04* (2013.01); *B62B 2205/20* (2013.01); *B62B 2501/06* (2013.01)

(58) Field of Classification Search
CPC ......... B62B 3/02; B62B 5/04; B62B 2205/20; B62B 2501/06; B62B 3/001; B62B 2205/06; B62B 3/025; B62B 5/00; F16B 5/0088
See application file for complete search history.

(56) References Cited

U.S. PATENT DOCUMENTS

| | | | | |
|---|---|---|---|---|
| 2,098,921 A * | 11/1937 | Mandaville | G02C 5/2227 16/292 |
| 5,394,574 A * | 3/1995 | Chuang | A47D 7/002 5/99.1 |
| 5,727,265 A * | 3/1998 | Ziegler | A47D 13/063 5/99.1 |
| 11,958,520 B1 * | 4/2024 | Sun | B62B 5/067 |
| 12,503,812 B2 * | 12/2025 | Forgacs | D06F 95/004 |
| 2005/0275195 A1 * | 12/2005 | Matula | B62B 5/0438 280/651 |
| 2016/0088914 A1 | 3/2016 | Marabotto | |
| 2023/0052125 A1 | 2/2023 | Latcham | |
| 2023/0303145 A1 | 9/2023 | Iimura et al. | |

FOREIGN PATENT DOCUMENTS

| | | | |
|---|---|---|---|
| CN | 107848553 A * | 3/2018 | B62B 7/068 |
| KR | 102025009 B1 * | 9/2019 | F16B 5/0088 |

* cited by examiner

*Primary Examiner* — Michael T. Walsh
(74) *Attorney, Agent, or Firm* — Getech Law LLC; Jun Ye

(57) ABSTRACT

The present disclosure provides a camping trolley, including a front trolley frame and a rear trolley frame, an upper folding frame and a lower folding frame which are opposite to each other at top and bottom are connected between two sides of each of the front trolley frame and the rear trolley frame; the upper folding frame includes an upper bending frame connected to the front trolley frame; the lower folding frame connected to the front trolley frame; each of the upper bending frame and the lower bending frame includes a front frame section and a rear frame section; the front frame section is connected to the front trolley frame; a space is reserved between the front and the rear frame section, and the front and the rear frame section are rotatably connected through a bending assembly; and the upper folding frame is sleeved with elastic cloth.

10 Claims, 6 Drawing Sheets

CAMPING TROLLEY

TECHNICAL FIELD

The present disclosure relates to the technical field of trolleys, and in particular, to a camping trolley.

BACKGROUND

Camping trolleys are tools for leisure tourism that have emerged in recent years. Literally, the camping trolleys are used to load camping equipment to outdoor camping areas for camping, so the camping trolleys have a considerable capacity to load some camping equipment. Chinese patent document No. 2022117021692 discloses a camping trolley. A storage space with an upward opening can be formed by mounting cloth on a trolley frame body and a railing frame. A user can either pull the camping trolley to move forwards through a pull rod assembly, or push the camping trolley to move forwards through a handle assembly. When the camping trolley is loaded with heavy objects, the pull rod assembly is usually used to pull the camping trolley to move forwards.

At present, for all the camping trolleys on the market, their trolley frame bodies only have a folding function, namely, during folding, the trolley frame body is folded. However, the camping trolleys do not have a function of bending when moving forwards, so that the flexibility of a trolley body of the camping trolley is not high, making it difficult to avoid the obstacles if there are obstacles on a road.

SUMMARY

To solve the above technical problems, the present disclosure provides a camping trolley.

The technical solution of the present disclosure is as follows: A camping trolley includes a front trolley frame and a rear trolley frame, wherein the front trolley frame and the rear trolley frame are respectively provided with a front transverse frame and a rear transverse frame which are opposite to each other at front and back; an upper folding frame and a lower folding frame which are opposite to each other at top and bottom are connected between two sides of each of the front trolley frame and the rear trolley frame; the upper folding frame includes an upper bending frame connected to the front trolley frame; the lower folding frame includes a lower bending frame connected to the front trolley frame; each of the upper bending frame and the lower bending frame includes a front frame section and a rear frame section; the front frame section is connected to the front trolley frame; a space is reserved between the front frame section and the rear frame section, and the front frame section and the rear frame section are rotatably connected through a bending assembly; and the upper folding frame is sleeved with elastic cloth. The bending assembly includes a front frame core and a rear frame core which are rotatably connected to each other; the front frame core and the rear frame core are slidably connected into the front frame section and the rear frame section, respectively; end portions, away from each other, of the front frame core and the rear frame core are magnetic suction ends; magnetic suction devices corresponding to the magnetic suction ends are arranged in the front frame section and the rear frame section; the front frame core and the rear frame core are internally hollowed and are provided with pressure springs; and two ends of the pressure springs respectively resist against the magnetic suction devices and the front frame core or the front frame core. A movable opening is provided on the front trolley frame; a connecting seat is arranged at a position, directly facing the movable opening, in the front trolley frame; the connecting seat is connected to a pull rod assembly; the pull rod assembly includes a hinge seat that is rotatably connected to the connecting seat; end holes are provided at two ends of the hinge seat; limiting surfaces are arranged on two sides of the hinge seat facing the interior of the front trolley frame; via holes located on two sides of the movable opening are further provided on the front trolley frame; two pressure sensing devices which are located on a rotation path of the hinge seat and are in contact with the limiting surfaces when the hinge seat rotates relative to the connecting seat are further arranged in the front trolley frame; two tension sensing devices respectively located on outer sides of the two pressure sensing devices are further arranged in the front trolley frame; and the tension sensing devices are connected to the hinge seat through tension springs passing through the via holes and the end holes in sequence. When both the pressure sensing device on one side and the tension sensing device on the other side detect that acting forces are greater than respective set values, the magnetic suction device on the same side as the tension sensing device switches from an energized state to a de-energized state, so that the front frame core and the rear frame core are separated from the respective magnetic suction devices.

As an implementation, a handle is rotatably connected to the rear trolley frame.

As an implementation, a flexible sleeve is arranged on the handle.

As an implementation, the pull rod assembly further includes a telescopic rod rotatably connected to the hinge seat; a buckle for clamping the telescopic rod is arranged on the front trolley frame; and a pull handle is arranged at an end portion of the telescopic rod.

As an implementation, each of the front trolley frame and the rear trolley frame is provided with an upper limiting frame and a lower limiting frame which are opposite to each other at top and bottom; the upper folding frame further includes an upper flip frame; the upper flip frame is rotatably connected to the rear frame section of the upper bending frame; and the upper flip frame and the front frame section of the upper bending frame are respectively rotatably connected to the upper limiting frames on the rear trolley frame and the front trolley frame.

The lower folding frame further includes a lower flip frame; the lower folding frame is rotatably connected to the rear frame section of the lower bending frame; and the lower flip frame and the front frame section of the lower bending frame are respectively rotatably connected to the upper limiting frames on the rear trolley frame and the front trolley frame.

A synchronous connecting rod is connected between a connection between the upper flip frame and the rear frame section of the upper bending frame and a connection between the lower flip frame and the rear frame section of the lower bending frame.

As an implementation, the two upper flip frames are provided with clamping seats, and the two clamping seats are detachably connected to a sunshade.

As an implementation, a dinner plate is detachably connected between the two upper folding frames.

As an implementation, universal wheels are arranged at a bottom of the front trolley frame, and brake wheels are arranged at a bottom of the rear trolley frame.

As an implementation, the universal wheels and the front trolley frame are detachably connected, and the brake wheels and the rear trolley frame are detachably connected.

As an implementation, the clastic cloth is textilene.

Compared with the prior art, the present disclosure has the beneficial effects: The upper folding frame and the lower folding frame are improved; and a trolley body side frame that cannot be bent originally are changed into the upper bending frame and the lower bending frame which can be bent. Control is performed by cooperation with the pull rod assembly at the front transverse frame, and implementation is performed by cooperation with the clastic cloth. When the hinge seat rotates to one side relative to the connecting seat, if a rotation amplitude is large enough, the limiting surfaces are in contact with the pressure sensing device located on this side, and the pressure sensing device generates a pressure value. As the hinge seat rotates, the tension sensing device on the other side also generates a higher tension under the action of the tension spring connected to the tension sensing device. When both the pressure sensing device on one side and the tension sensing device on the other side detect that acting forces are greater than their respective set values, the magnetic suction device on the same side as the tension sensing device switches from an energized state to a de-energized state, causing the front frame core and the rear frame core to be separated from their respective magnetic suction devices. Therefore, the trolley body of the camping trolley bends. Namely, when a user pulls the camping trolley to turn, first, the pull rod assembly drives the hinge seat to rotate; the effective lengths of the front frame core and the rear frame core on the side to which the hinge seat turns are unchanged; and the effective lengths of the front frame core and the rear frame core on the side opposite to the side to which the hinge seat turns increase. After the turning is completed, as the user corrects a traction direction of the pull rod assembly, the hinge seat returns to its original position, and the de-energized magnetic suction device no longer meets a de-energization triggering condition. The magnetic suction device restores the magnetic suction force, causing the front frame core and the rear frame core to be sucked to their respective magnetic suction devices again. Therefore, the overall bending and turning of the trolley body of the camping trolley automatically change with the traction direction of the pull rod assembly, so that the trolley body of the camping trolley is higher in flexibility.

Figure 1:
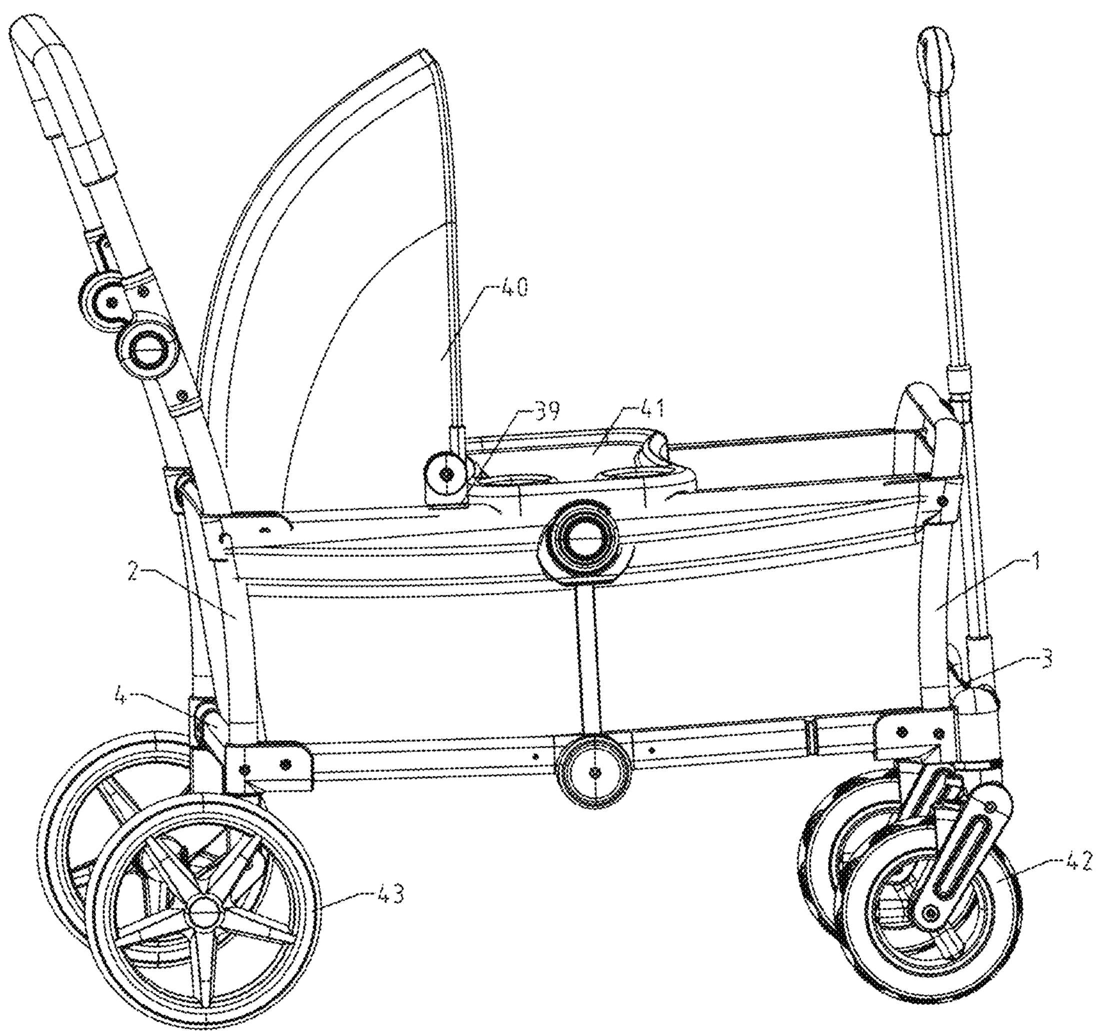
FIG. 1 is a schematic structural diagram of a camping trolley provided according to an implementation of the present disclosure.
Figure 2:
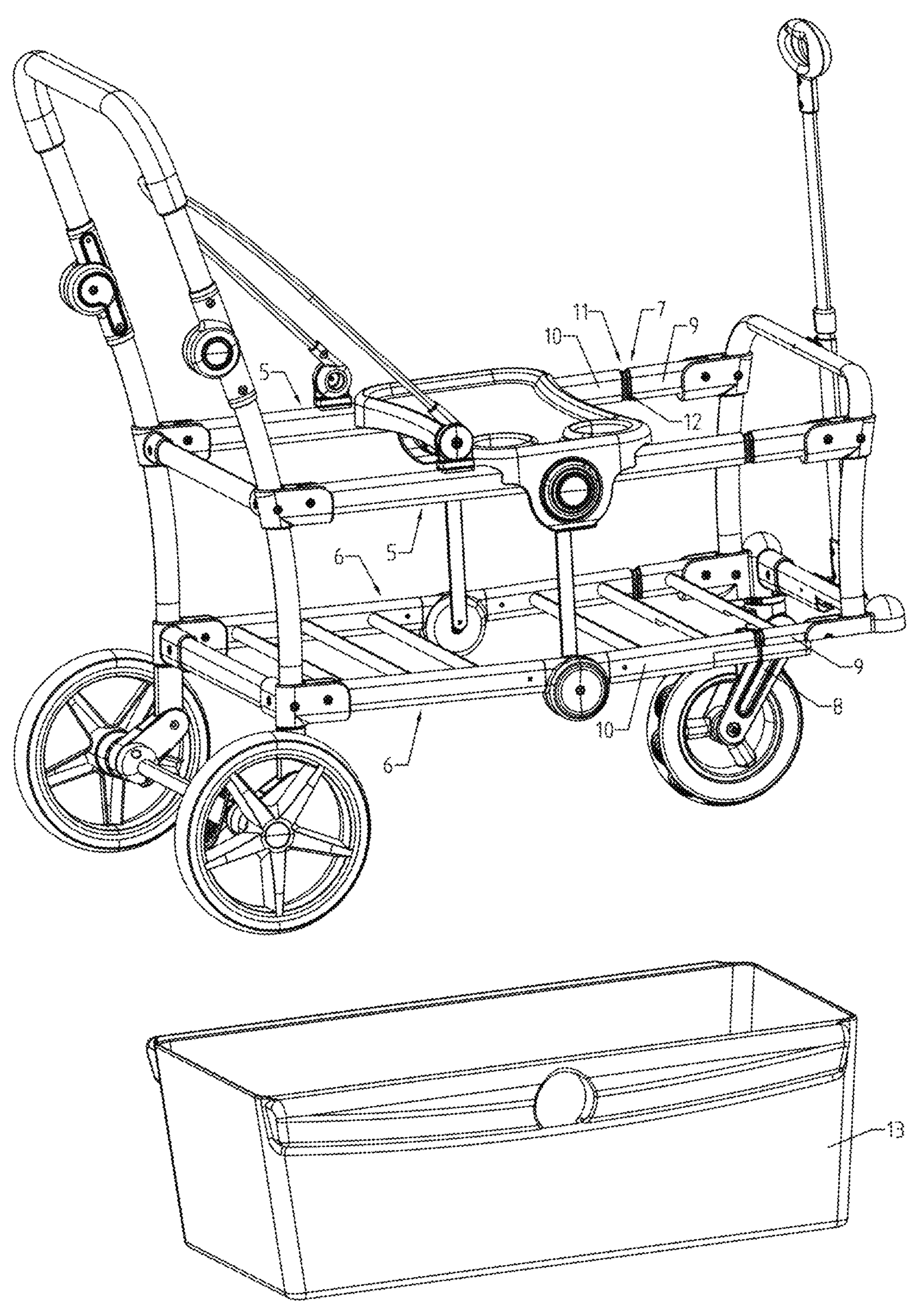
FIG. 2 is an exploded diagram of a camping trolley provided according to an implementation of the present disclosure.

In the drawings: 1: front trolley frame; 2: rear trolley frame; 3: front transverse frame; 4: rear transverse frame; 5: upper folding frame; 6: lower folding frame; 7: upper bending frame; 8: lower bending frame; 9: front frame section; 10: rear frame section; 11: space; 12: bending assembly; 13: elastic cloth; 14: front frame core; 15: rear frame core; 16: magnetic suction end; 17: magnetic suction device; 18: pressure spring; 19: movable opening; 20: connecting seat; 21: pull rod assembly; 22: hinge seat; 23: end hole; 24: limiting surface; 25: via hole; 26: pressure sensing device; 27: tension sensing device; 28: tension spring; 29: handle; 30: flexible sleeve; 31: telescopic rod; 32: buckle; 33: pull handle; 34: upper limiting frame; 35: lower limiting frame; 36: upper flip frame; 37: lower flip frame; 38: synchronous connecting rod; 39: clamping seat; 40: sunshade; 41: dinner plate; 42: universal wheel; and 43: brake wheel.

DETAILED DESCRIPTION OF THE EMBODIMENTS

The above and other implementations and advantages of the present disclosure will be clearly and completely described below in combination with the accompanying drawings. Apparently, the implementations described are only some implementations of the present disclosure, but not all the implementations.

In an embodiment, as shown in FIG. 1 to FIG. 6, a camping trolley provided by this implementation includes a front trolley frame 1 and a rear trolley frame 2, wherein the front trolley frame 1 and the rear trolley frame 2 are respectively provided with a front transverse frame 3 and a rear transverse frame 4 which are opposite to each other at front and back; an upper folding frame 5 and a lower folding frame 6 which are opposite to each other at top and bottom are connected between two sides of each of the front trolley frame 1 and the rear trolley frame 2; the upper folding frame 5 includes an upper bending frame 7 connected to the front trolley frame 1; the lower folding frame 6 includes a lower bending frame 8 connected to the front trolley frame 1; each of the upper bending frame 7 and the lower bending frame 8 includes a front frame section 9 and a rear frame section 10; the front frame section 9 is connected to the front trolley frame 1; a space 11 is reserved between the front frame section 9 and the rear frame section 10, and the front frame section 9 and the rear frame section 10 are rotatably connected through a bending assembly 12; the upper folding frame 5 is sleeved with elastic cloth 13. The bending assembly 12 includes a front frame core 14 and a rear frame core 15 which are rotatably connected to each other; the front frame core 14 and the rear frame core 15 are slidably connected into the front frame section 9 and the rear frame section 10, respectively; end portions, away from each other, of the front frame core 14 and the rear frame core 15 are magnetic suction ends 16; magnetic suction devices 17 corresponding to the magnetic suction ends 16 are arranged in the front frame section 9 and the rear frame section 10; the front frame core 14 and the rear frame core 15 are internally hollowed and are provided with pressure springs 18; and two ends of the pressure springs 18 respectively resist against the magnetic suction devices 17 and the front frame core 14 or the front frame core 14. A movable opening 19 is provided on the front trolley frame 1; a connecting seat 20 is arranged at a position, directly facing the movable opening 19, in the front trolley frame 1; the connecting seat 20 is connected to a pull rod assembly 21; the pull rod assembly 21 includes a hinge seat 22 that is rotatably connected to the connecting seat 20; end holes 23 are provided at two ends of the hinge seat 22; limiting surfaces 24 are arranged on two sides of the hinge seat 22 facing the interior of the front trolley frame 1; via holes 25 located on two sides of the movable opening 19 are further provided on the front trolley frame 1; two pressure sensing devices 26 which are located on a rotation path of the hinge seat 22 and are in contact with the limiting surfaces 24 when the hinge seat 22 rotates relative to the connecting seat 20 are further arranged in the front trolley frame 1; two tension sensing devices 27 respectively located on outer sides of the two pressure sensing devices 26 are further arranged in the front trolley frame 1; the tension sensing devices 27 are connected to the hinge seat 22 through tension springs 28 passing through the via holes 25 and the end holes 23 in sequence. When both the pressure sensing device 26 on one side and the tension sensing device 27 on the other side detect that acting forces are greater than respective set values, the magnetic suction device 17 on the same side as the tension sensing device 27 switches from an energized state to a de-energized state, so that the front frame core 14 and the rear frame core 15 are separated from the respective magnetic suction devices 17.

Figure 3:
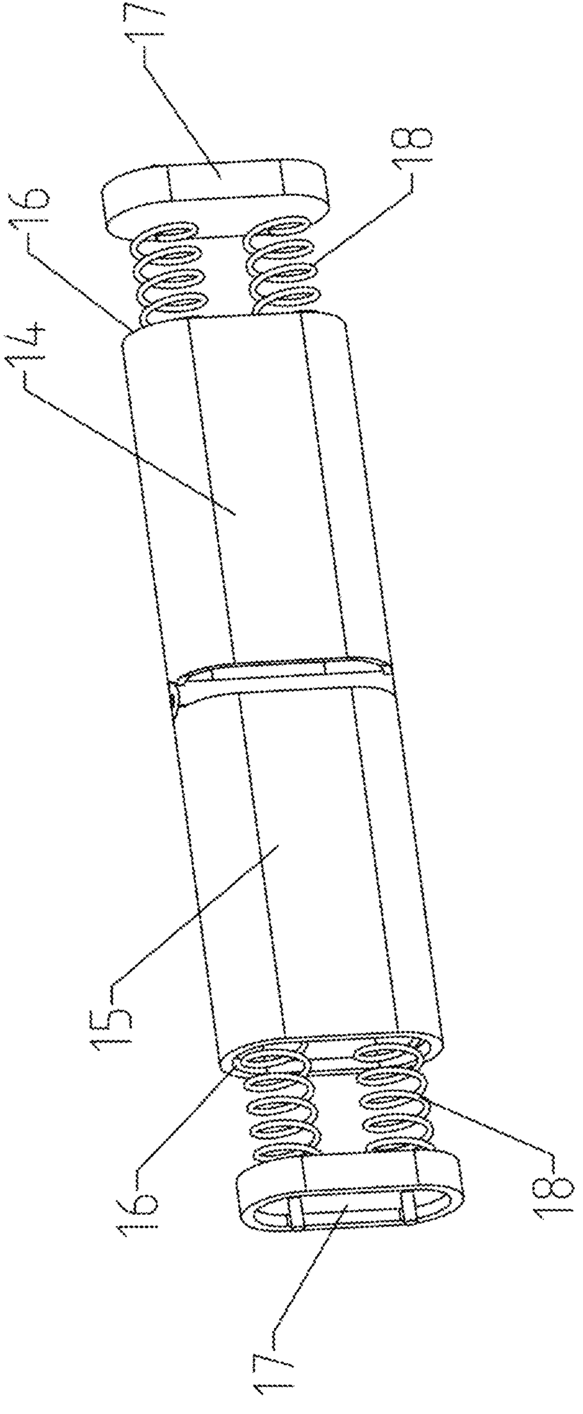
FIG. 3 is a schematic structural diagram of a bending assembly provided according to an implementation of the present disclosure.
Figure 4:
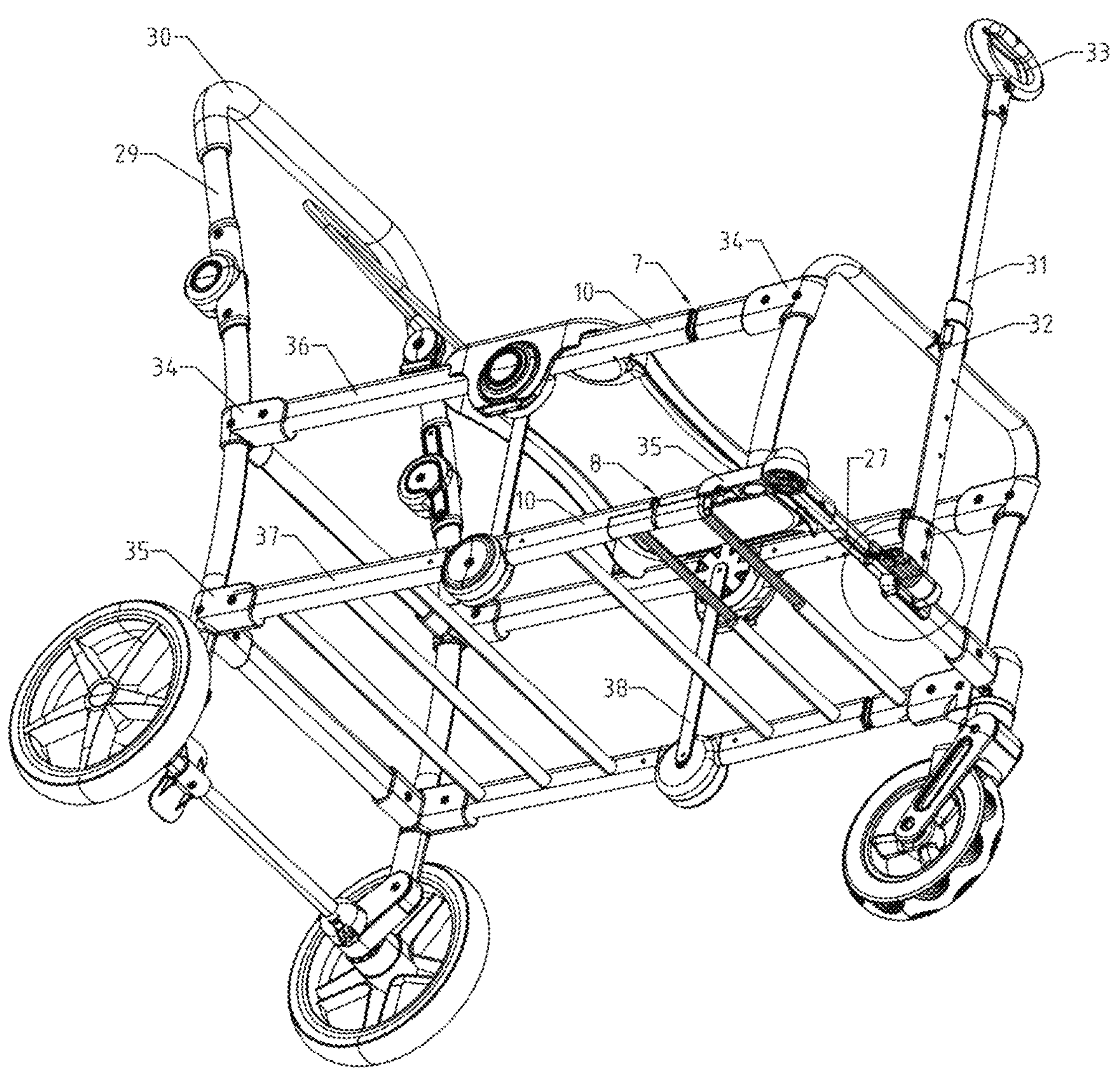
FIG. 4 is a partially sectional view of a bottom view of a camping trolley provided according to an implementation of the present disclosure.
Figure 5:
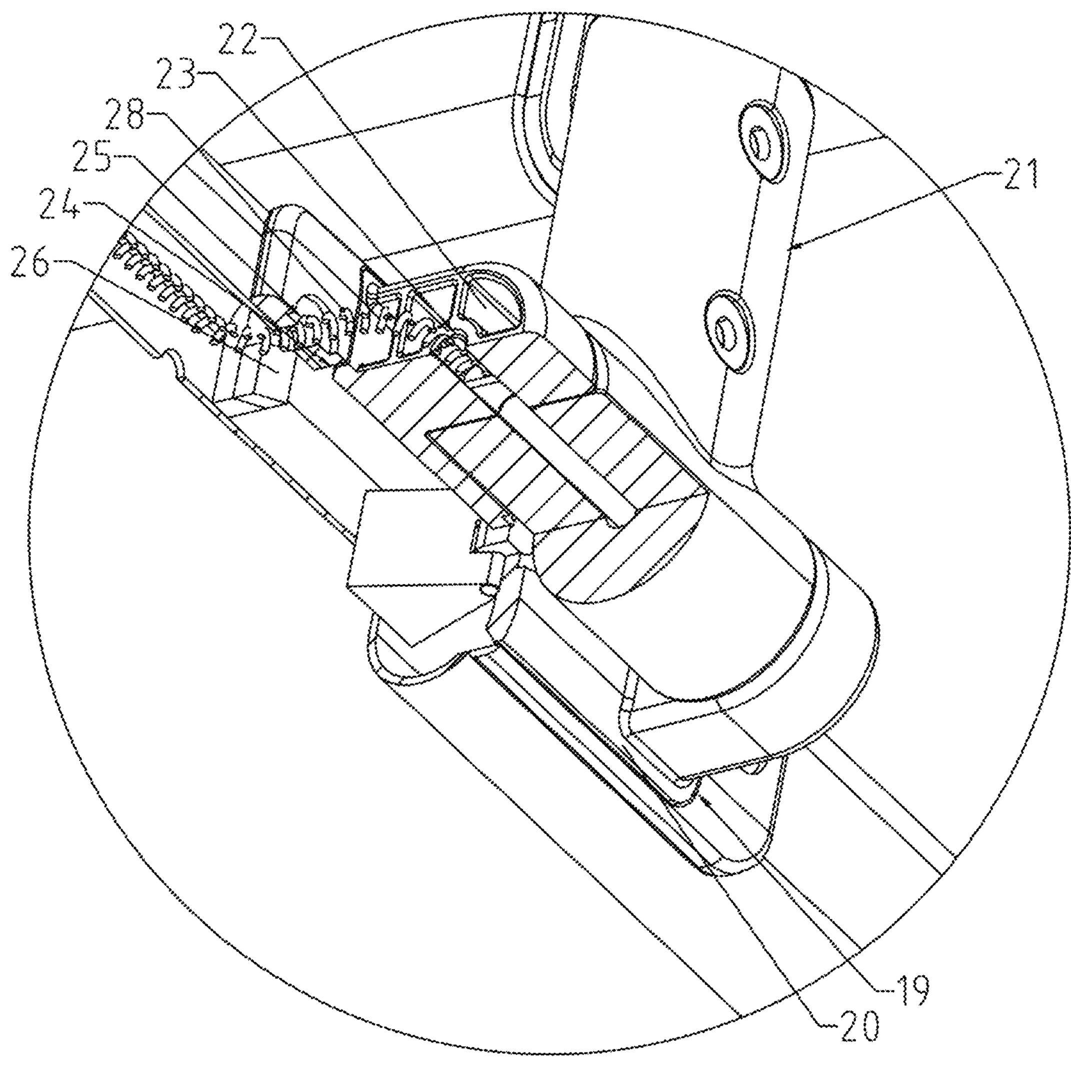
FIG. 5 is a partially enlarged diagram of the camping trolley provided in FIG. 4.
Figure 6:
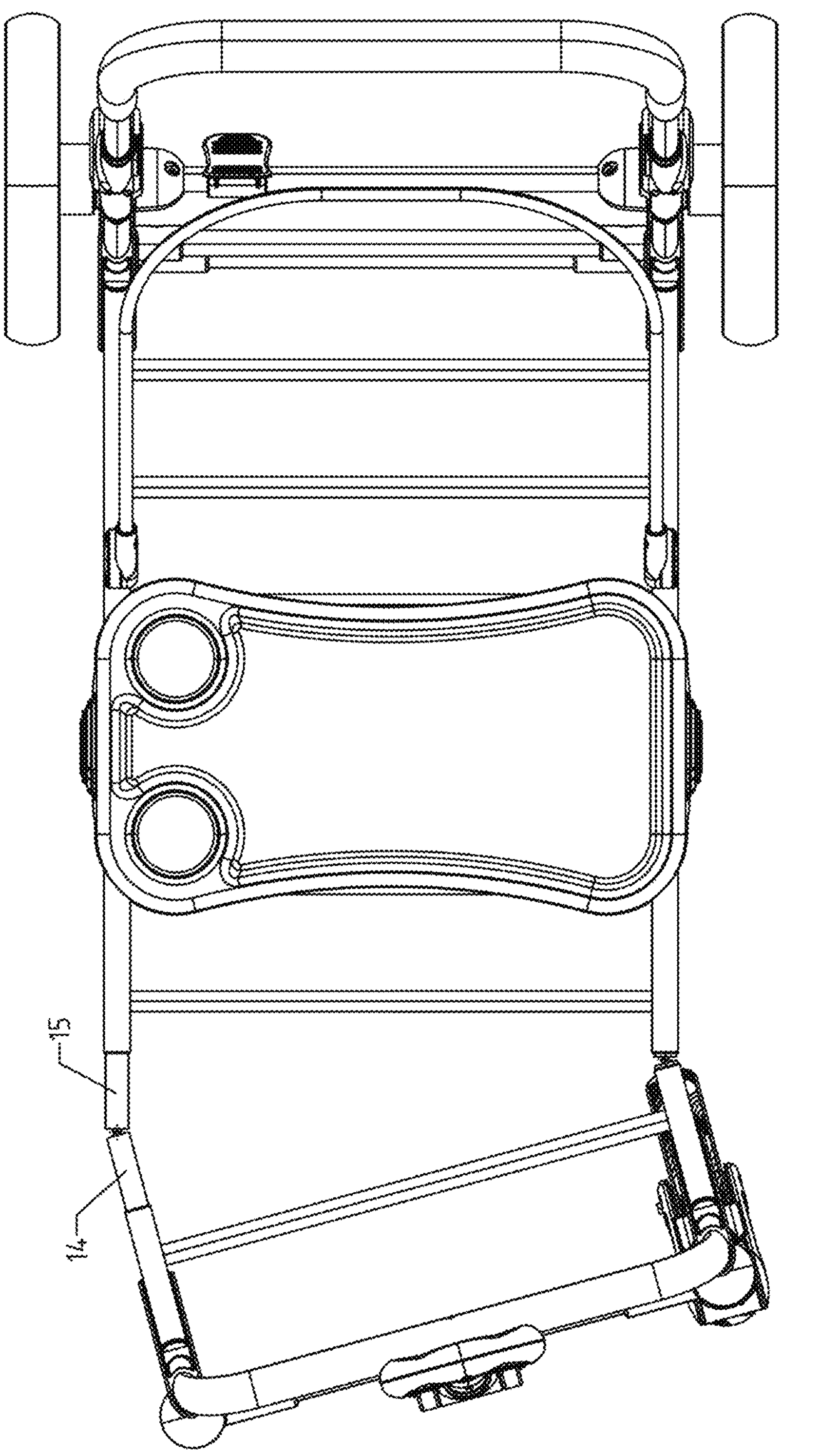
FIG. 6 is a top view of a camping trolley during turning provided according to an implementation of the present disclosure.

In this implementation, to make the camping trolley have a more flexible a trolley body and more easily avoid obstacles on a road, the camping trolley with the above structure is provided. According to the camping trolley provided in this implementation, the upper folding frame 5 and the lower folding frame 6 are improved; and a trolley body side frame that cannot be bent originally are changed into the upper bending frame 7 and the lower bending frame 8 which can be bent. Control is performed by cooperation with the pull rod assembly 21 at the front transverse frame 3, and implementation is performed by cooperation with the elastic cloth 13. When the hinge seat 22 rotates to one side relative to the connecting seat 20, if a rotation amplitude is large enough, the limiting surfaces 24 are in contact with the pressure sensing device 26 located on this side, and the pressure sensing device 26 generates a pressure value. As the hinge seat 22 rotates, the tension sensing device 27 on the other side also generates a higher tension under the action of the tension spring 28 connected to the tension sensing device. When both the pressure sensing device 26 on one side and the tension sensing device 27 on the other side detect that acting forces are greater than respective set values, the magnetic suction device 26 on the same side as the tension sensing device 17 switches from an energized state to a de-energized state, so that the front frame core 14 and the rear frame core 15 are separated from the respective magnetic suction devices 17. As shown in FIG. 3 and FIG. 4, FIG. 4 shows a state where both the front frame core 14 and the rear frame core 15 are sucked on the magnetic suction devices 17. At this time, the pressure springs 18 inside the front frame core 14 and the rear frame core 15 are compressed. The effective lengths of the front frame core 14 and the rear frame core 15 are fixed, so the trolley body of the camping trolley does not bend. FIG. 3 shows a state where the front frame core 14 and the rear frame core 15 are separated from their respective magnetic suction devices 17. Under the action of the pressure springs 18, the effective lengths of the front frame core 14 and the rear frame core 15 are both indefinite values. Furthermore, under the driving of the turning of the pull rod assembly 21, increased lengths theoretically generated by the front frame core 14 and the rear frame core 15 are equal, as shown in FIG. 6. This occurs when the magnetic suction device 17 on one side is de-energized, but the magnetic suction device 17 on the other side is still energized, so that the trolley body of the camping trolley bends.

In this implementation, when the camping trolley is driven to move forwards through the handle 29, the trolley body of the camping trolley does not bend. The camping trolley is pulled to move forwards through the pull handle 33, so that the trolley body of the camping trolley can bend. When a user pulls the camping trolley to turn, first, the pull rod assembly 21 drives the hinge seat 22 to rotate; the effective lengths of the front frame core 14 and the rear frame core 15 on the side to which the hinge seat 22 turns are unchanged; and the effective lengths of the front frame core 14 and the rear frame core 15 on the side opposite to the side to which the hinge seat 22 turns increase. After the turning is completed, as the user corrects a traction direction of the pull rod assembly 21, the hinge seat 22 returns to its original position, and the de-energized magnetic suction device 17 no longer meets a de-energization triggering condition. The magnetic suction device 17 restores the magnetic suction force, causing the front frame core 14 and the rear frame core 15 to be sucked to their respective magnetic suction devices 17 again. Therefore, the overall bending and turning of the trolley body of the camping trolley automatically change with the traction direction of the pull rod assembly 21, so that the trolley body of the camping trolley is higher in flexibility.

In an implementation, as shown in FIG. 4, according to the camping trolley provided in this implementation, a handle 29 is rotatably connected to the rear trolley frame 2. A flexible sleeve 30 is arranged on the handle 29. The pull rod assembly 21 further includes a telescopic rod 31 that is rotatably connected to the hinge seat 22. The front trolley frame 1 is provided with a buckle 32 for clamping the telescopic rod 31, and a pull handle 33 is arranged at an end portion of the telescopic rod 31.

In this implementation, the camping trolley is pushed to move forwards through the handle 29 and pulled to move forwards through the handle 33. Moreover, the handle 29 can be folded. The handle is downwards rotated to be stacked together with the rear trolley frame 2. The pull rod assembly 21 can be folded too. After being shortened, the telescopic rod 31 is fixed to the front trolley frame 1 through the buckle 32.

In an implementation, as shown in FIG. 4, according to the camping trolley provided in this implementation, each of the front trolley frame 1 and the rear trolley frame 2 is provided with an upper limiting frame 34 and a lower limiting frame 35 which are opposite to each other at top and bottom; the upper folding frame 5 further includes an upper flip frame 36; the upper flip frame 36 is rotatably connected to the rear frame section 10 of the upper bending frame 7; and the upper flip frame 36 and the front frame section 9 of the upper bending frame 7 are respectively rotatably connected to the upper limiting frames 34 on the rear trolley frame 1 and the front trolley frame 2. The lower folding frame 6 further includes a lower flip frame 37; the lower folding frame 37 is rotatably connected to the rear frame section 10 of the lower bending frame 8; the lower flip frame 37 and the front frame section 9 of the lower bending frame 8 are respectively rotatably connected to the upper limiting frames 34 on the rear trolley frame 1 and the front trolley frame 2; and a synchronous connecting rod 38 is connected between a connection between the upper flip frame 36 and the rear frame section 10 of the upper bending frame 7 and a connection between the lower flip frame 37 and the rear frame section 10 of the lower bending frame 8.

In this implementation, through the above structure, the upper folding frame 5 and the lower folding frame 6 can be folded. The upper flip frame 36 and the lower flip frame 37 can rotate relative to the rear transverse frame 4, and the upper bending frame 7 and the lower bending frame 8 can also rotate relative to the front transverse frame 3. Moreover, the upper folding frame 5 and the upper bending frame 7 can rotate relative to each other. When the upper folding frame and the upper bending frame rotate until they are in horizontal positions, namely, in a state shown in FIG. 4, the upper folding frame and the upper bending frame are limited and will no longer rotate. The lower folding frame 6 and the lower bending frame 8 are in the same manner. Furthermore, due to the connecting effect of the synchronous connecting rod 38, the upper folding frame 5 can be folded synchronously with the upper bending frame 7, and the lower folding frame 6 can be folded synchronously with the lower bending frame 8.

In an implementation, as shown in FIG. 1, according to the camping trolley provided in this implementation, the two upper flip frames 36 are provided with clamping seats 39, and the two clamping seats 39 are detachably connected with a sunshade 40.

In this implementation, by the arrangement of the clamping seats 39, the sunshade 40 and the clamping seats 39 can be detachably connected. The sunshade 40 can achieve a sunshading effect. The camping trolley can be configured to load camping equipment. After the camping trolley reaches a destination, the camping equipment is moved out. Children can sit in the trolley to have meals and lie down to take a rest. The sunshade 40 can provide shade for children at this time.

In an implementation, as shown in FIG. 1, according to the camping trolley provided in this implementation, a dinner plate 41 is detachably connected between the two upper folding frames 5.

In this implementation, by the arrangement of the dinner plate 41, children can sit in the trolley to have meals. Four children can sit in the trolley, respectively on two sides of the dinner plate 41.

In an implementation, as shown in FIG. 1, according to the camping trolley provided in this implementation, universal wheels 42 are arranged at a bottom of the front trolley frame 1, and brake wheels 43 are arranged at a bottom of the rear trolley frame 2. The universal wheels 42 are detachably connected to the front trolley frame 1, and the brake wheels 43 are detachably connected to the rear trolley frame 2.

In this implementation, due to the combination of the universal wheels 42 and the brake wheels 43, the camping trolley has a better use experience. This combination is generally used in other camping trolleys too.

In an implementation, as shown in FIG. 1, according to the camping trolley provided in this implementation, the elastic cloth 13 is textilene.

In this implementation, due to the use of the textilene, the camping trolley can be dried quickly if it is splashed with water, so that the user experience is improved, particularly during camping on a riverside and a brookside.

The specific implementations described above provide further detailed explanations to the invention purposes, technical solutions, and beneficial effects of the present disclosure. It should be understood that the above only describes the specific implementations of the present disclosure and is not intended to limit the scope of protection of the present disclosure. It is particularly pointed out that for those skilled in the art, any modifications, equivalent replacements, improvements, and the like made within the spirit and the principle of the present disclosure shall fall within the scope of protection of the present disclosure.

What is claimed is:

1. A camping trolley, comprising a front trolley frame (1) and a rear trolley frame (2), wherein the front trolley frame (1) and the rear trolley frame (2) are respectively provided with a front transverse frame (3) and a rear transverse frame (4) which are opposite to each other at front and back; an upper folding frame (5) and a lower folding frame (6) which are opposite to each other at top and bottom are connected between two sides of each of the front trolley frame (1) and the rear trolley frame (2); the upper folding frame (5) comprises an upper bending frame (7) connected to the front trolley frame (1); the lower folding frame (6) comprises a lower bending frame (8) connected to the front trolley frame (1); each of the upper bending frame (7) and the lower bending frame (8) comprises a front frame section (9) and a rear frame section (10); the front frame section (9) is connected to the front trolley frame (1); a space (11) is reserved between the front frame section (9) and the rear frame section (10), and the front frame section (9) and the rear frame section (10) are rotatably connected through a bending assembly (12); the upper folding frame (5) is sleeved with elastic cloth (13);

the bending assembly (12) comprises a front frame core (14) and a rear frame core (15) which are rotatably connected to each other; the front frame core (14) and the rear frame core (15) are slidably connected into the front frame section (9) and the rear frame section (10), respectively; end portions, away from each other, of the front frame core (14) and the rear frame core (15) are magnetic suction ends (16); magnetic suction devices (17) corresponding to the magnetic suction ends (16) are arranged in the front frame section (9) and the rear frame section (10); the front frame core (14) and the rear frame core (15) are internally hollowed and are provided with pressure springs (18); two ends of the pressure springs (18) respectively resist against the magnetic suction devices (17) and the front frame core (14) or the front frame core (14);

a movable opening (19) is provided on the front trolley frame (1); a connecting seat (20) is arranged at a position, directly facing the movable opening (19), in the front trolley frame (1); the connecting seat (20) is connected to a pull rod assembly (21); the pull rod assembly (21) comprises a hinge seat (22) that is rotatably connected to the connecting seat (20); end holes (23) are provided at two ends of the hinge seat (22); limiting surfaces (24) are arranged on two sides of the hinge seat (22) facing the interior of the front trolley frame (1); via holes (25) located on two sides of the movable opening (19) are further provided on the front trolley frame (1); two pressure sensing devices (26) which are located on a rotation path of the hinge seat (22) and are in contact with the limiting surfaces (24) when the hinge seat (22) rotates relative to the connecting seat (20) are further arranged in the front trolley frame (1); two tension sensing devices (27) respectively located on outer sides of the two pressure sensing devices (26) are further arranged in the front trolley frame (1); the two tension sensing devices (27) are connected to the hinge seat (22) through tension springs (28) passing through the via holes (25) and the end holes (23) in sequence; and when both one pressure sensing device of the two pressure sensing devices (26) on one side of the two sides of the movable opening, and one tension sensing device of the two tension sensing devices (27) on an opposite side of the one side of the two sides of the movable opening, detect that acting forces are greater than respective set values, the magnetic suction device (17) on the same side as the one tension sensing device of the two tension sensing devices (27) switches from an energized state to a de-energized state, so that the front frame core (14) and the rear frame core (15) are separated from the respective magnetic suction devices (17).

2. The camping trolley according to claim 1, wherein a handle (29) is rotatably connected to the rear trolley frame (2).

3. The camping trolley according to claim 1, wherein a flexible sleeve (30) is arranged on the handle (29).

4. The camping trolley according to claim 1, wherein the pull rod assembly (21) further comprises a telescopic rod (31) rotatably connected to the hinge seat (22); a buckle (32) for clamping the telescopic rod (31) is arranged on the front trolley frame (1); and a pull handle (33) is arranged at an end portion of the telescopic rod (31).

5. The camping trolley according to claim 1, wherein each of the front trolley frame (1) and the rear trolley frame (2) is provided with an upper limiting frame (34) and a lower limiting frame (35) which are opposite to each other at top and bottom; the upper folding frame (5) further comprises an upper flip frame (36); the upper flip frame (36) is rotatably connected to the rear frame section (10) of the upper bending frame (7); the upper flip frame (36) and the front frame section (9) of the upper bending frame (7) are respectively rotatably connected to the upper limiting frames (34) on the rear trolley frame (2) and the front trolley frame (1);

the lower folding frame (6) further comprises a lower flip frame (37); the lower folding frame (37) is rotatably connected to the rear frame section (10) of the lower bending frame (8); the lower flip frame (37) and the front frame section (9) of the lower bending frame (8) are respectively rotatably connected to the upper limiting frames (34) on the rear trolley frame (2) and the front trolley frame (1); and a synchronous connecting rod (38) is connected between a connection between the upper flip frame (36) and the rear frame section (10) of the upper bending frame (7) and a connection between the lower flip frame (37) and the rear frame section (10) of the lower bending frame (8).

6. The camping trolley according to claim 5, wherein the two upper flip frames (36) are provided with clamping seats (39), and the two clamping seats (39) are detachably connected to a sunshade (40).

7. The camping trolley according to claim 1, wherein a dinner plate (41) is detachably connected between the two upper folding frames (5).

8. The camping trolley according to claim 1, wherein universal wheels (42) are arranged at a bottom of the front trolley frame (1), and brake wheels (43) are arranged at a bottom of the rear trolley frame (2).

9. The camping trolley according to claim 8, wherein the universal wheels (42) and the front trolley frame (1) are detachably connected, and the brake wheels (43) and the rear trolley frame (2) are detachably connected.

10. The camping trolley according to claim 8, wherein the elastic cloth (13) is textilene.

* * * * *